Nov. 8, 1966  H. K. NANSEL  3,284,036
CARRIER LINK CHAIN ASSEMBLY FOR HOSES
Filed May 6, 1965
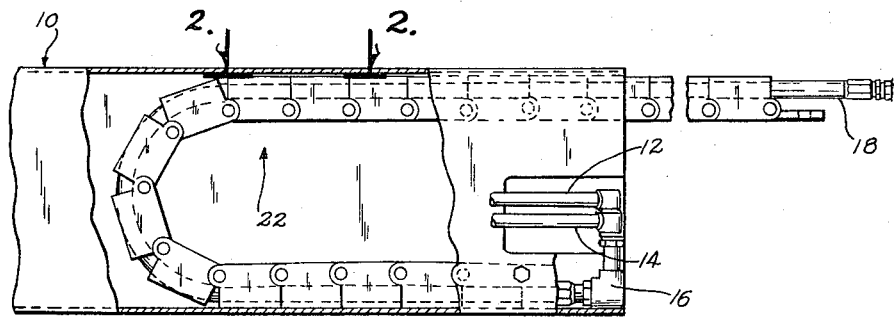
*Fig. 1*
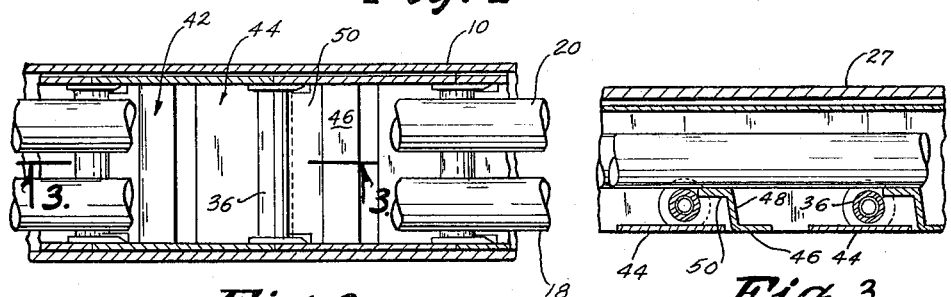
*Fig. 2*  *Fig. 3*
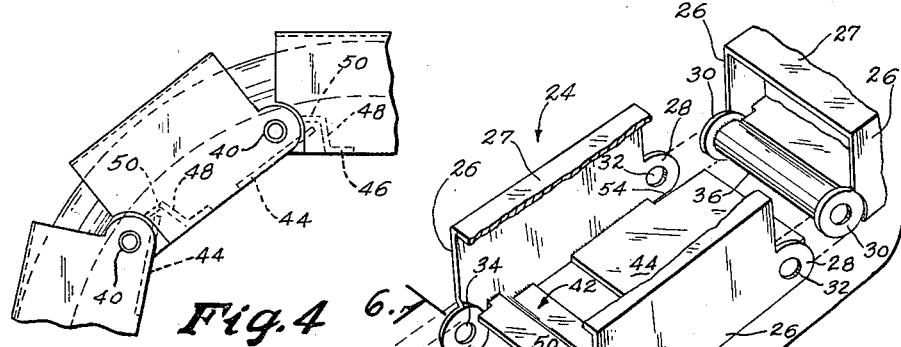
*Fig. 4*  *Fig. 5*
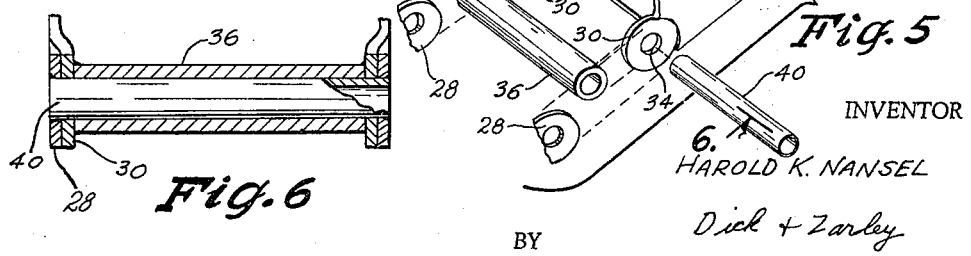
*Fig. 6*
INVENTOR
HAROLD K. NANSEL
BY Dick + Zarley
ATTORNEY

United States Patent Office 3,284,036
Patented Nov. 8, 1966

3,284,036
CARRIER LINK CHAIN ASSEMBLY FOR HOSES
Harold K. Nansel, Waverly, Nebr., assignor to National Crane Corporation, Waverly, Nebr., a corporation of Nebraska
Filed May 6, 1965, Ser. No. 453,690
6 Claims. (Cl. 248—49)

This invention relates to a supporting means for flexible members and in particular to a movable support for electrical cables, pneumatic hoses and hydraulic lines.

Industrial equipment in factories, cranes working outdoors and other types of equipment frequently require power at various points in the working area. The power line equipment cannot be left to merely dangle freely but needs a supporting means which is flexible and may bend to the desired shape to reach the various points in the working area.

It is therefore an object of this invention to provide a hose or the like support which is adapted to hold the hose in any desired position and guide it during its operative movement or flexure to distribute flexing strains along the length of the hose.

Another object of this invention is to provide a supporting means for flexible hoses wherein the hose may be readily inserted into and removed from the supporting means.

Another object of this invention is to provide a supporting means for flexible hoses or the like members which has a smooth exterior design allowing the supporting carrier to pass into and out of a storage box without the carrier means catching on the storage box or producing substantial frictional wearing at contact points.

Another object of this invention is to provide a supporting means for flexible members such as hoses or the like wherein the supporting means utilizes a series of similar link members pivotally connected together.

A further object of this invention is to provide a supporting means for flexible members which is simple in design, economical to manufacture and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a side elevation view of the hose supported by the chain carrier support means and partially stored within a storage box, a portion of the storage box being broken away for purposes of illustrating the hose carrier contained therein:

FIG. 2 is a top plan view taken along line 2—2 in FIG. 1;

FIG. 3 is an elevation cross-sectional view taken along line 3—3 in FIG. 2;

FIG. 4 is a fragmentary side elevation view of the chain carrier for hoses showing several of the link members pivoted to an arcuate position for supporting the hose as it extends around a 180 degree bend;

FIG. 5 is an enlarged perspective view of one of the supporting link members and the two adjacent members pivotally connected thereto; and FIG. 6 is a fragmentary cross-sectional view taken along line 6—6 in FIG. 5.

A storage container 10 in FIG. 1 includes a pair of hoses 12 and 14 leading from a liquid or gas pressure source interconnecting a joint 16 to hoses 18 and 20 (FIG. 2). The hoses 18 and 20 extend into and through the chain link carrier support means generally referred to be reference numeral 22.

The chain link carrier support means 22 comprises a plurality of similar links 24 each extending in the same direction and pivotally connected together at their ends. Each link 24 as illustrated in FIG. 5 includes an inverted channel element having a pair of vertical side walls 26 and a base 27 which serves as a cover for the link 24. A pair of ears 28 are formed in the planes of the side walls 26 at one end thereof along the lower longitudinal edge. At the opposite end of the side walls 26 along the lower longitudinal edge a pair of ears 30 are provided which are disposed inwardly of the side walls 26. Aligned openings 32 are formed in the ears 28 and similarly, aligned openings 34 are formed in the ears 30. A sleeve bearing 36 is welded or held in any other suitable manner between the ears 30 with its longitudinal opening in alignment with the openings 34. The ears 30 are inwardly offset from the side walls 26 a sufficient distance to matingly engage the inner side walls of the ears 28 on the adjacent link as illustrated in FIG. 5. A hollow pin 40 is then inserted through the two pair of ears 28 and 36 which are in alignment with the opening through the bearing sleeve 36. The pin 40 is then flattened or welded at its ends to maintain it in its desired position within the sleeve 36.

Interconnecting the side walls 26 at each end thereof are two separate plate elements 42 and 44. The plate element 42 adjacent the ears 30 as illustrated in FIG. 3, includes a first portion 46 welded to the side walls 26 along their lower inside longitudinal edges. This portion then extends upwardly into a vertical portion 48 which terminates in a second horizontal portion 50 which extends into contact with the bearing sleeve 36 with the portion 50 at its top surface in approximately the same plane as the top surface of the bearing sleeve 36. The horizontal portion 50 is spaced inwardly along the length of the link 24 and thereby provides a hose supporting surface in cooperation with the bearing sleeve 36 (FIG. 3). Moreover, the opposite end of the link 24 is provided with a flat plate element 44 extending in the same plane as the portion 46 of plate element 42 and under the adjacent bearing sleeve 36. To receive the ears 30 between the plate element 44 and the ears 28, a portion is cut away from the plate 44 along its longitudinal outer end edge to form a slot 54 between the plate element 44 and the ears 28. Thus the ears 30 may be positioned between the ears 28 above the plate element 44 is illustrated in FIGS. 3 and 5. As illustrated in FIG. 4, the outer end of the plate element 44 serves to limit the pivotal movement between the link members 24 since the outer transverse edge of the element 44 eventually pivots into bearing contact with the bottom surface of the portion 50 of the plate element 42. Accordingly, it is seen that the hose support chain assembly may be designed to permit bending thereof into an arc having a desired radius of curvature as seen in FIG. 4. Also, it is to be appreciated as illustrated in FIG. 3, spaced apart transverse supporting surfaces are provided by the sleeve bearings 36 and the portions 50 of the plate elements 42 of each link 24.

As illustrated in FIG. 2, the pivotally joined together link elements 24 present a very smooth exterior side surface which may move along the side walls of the storage unit 10 without undue frictional wear thereon. The hoses 18 and 20 may be easily placed in the chain support carrier or removed therefrom by threading them through the series of interconnected links 24. The simplified construction of each chain link 24 by only employing two plate elements 42 and 44 extending between the side walls 26 minimizes to the greatest extent possible the cost of mass producing the hose carrier support assembly. Each of the plate elements 42 and 44 not only cooperate to limit the pivotal action between adjacent link elements 24 as illustrated in FIG. 4, but also to provide the necessary structural strength required for the hose chain support structure.

As best illustrated in FIG. 1, the links 24 are prevented from pivoting in one direction since the vertical edges of the side walls 26 above the ears 28 and 30 and the base elements 27 bear against each other respectively on adjacent link elements 24 thereby presenting a strong rigid support member for the hoses 18 and 20. On the other hand, the link elements 24 are free to pivot in the opposite direction about the pins 40 extending through their opposite ends to provide support around 180 degree bends or the like as illustrated in FIGS. 1 and 4.

Some changes may be made in the construction and arrangement of my Carrier Link Chain Assembly For Hoses without departing from the real spirit and purpose of my invention, and it is my intention to cover by my claims, any modified forms of structure or use of mechanical equivalents which may be reasonably included within their scope.

I claim:

1. In a carrier chain link assembly for hoses or the like, comprising,
a plurality of link members, each of said link members having a pair of side walls, an element interconnecting said pair of side walls at each end of said link, said side walls having portions with aligned openings at each end adjacent their lower edges, pin means pivotally received in the aligned openings of adjacent link members, and said element at one end of said link extending in a plane adjacent the top of said pin means and the element at the other end extending under the adjacent pin means, and
said link elements each facing in the same direction and adapted to pivot to positions along an arc, said element at said other end of each link engaging the said element at said one end of the adjacent link upon said link elements being pivoted to said arcuate position thereby limiting the pivoting movement of adjacent link elements relative to each other.

2. In a carrier chain link assembly for hoses or the like, comprising,
a plurality of link members, each of said link members having a pair of side walls, an element interconnecting said pair of side walls at each end of said link, said side walls having portions with aligned openings at each end adjacent and above their lower edges, pin means pivotally received in the aligned openings of adjacent link members, and said element at one end of said link extending in a plane adjacent the top of said pin means and the element at the other end extending under the adjacent pin means, and
said link elements each facing in the same direction and adapted to pivot to positions along an arc, said element at said other end of each link engaging the said element at said one end of the adjacent link upon said link elements being pivoted to said arcuate position thereby limiting the pivoting movement of adjacent link elements relative to each other.

3. In a carrier chain link assembly for hoses or the like, comprising,
a plurality of link members, each of said link members having a pair of side walls, a plate element interconnecting said pair of side walls at each end of said link, said side walls having portions with aligned openings at each end adjacent their lower edges, said portions of said side walls at one end having said aligned openings being inwardly offset relative to the other end to be received between the portions at the other end of an adjacent link, pin means pivotally received in the aligned openings of adjacent link members, and said element at one end of said link extending in a plane adjacent the top of said pin means and the element at the other end extending under the adjacent pin means, and
said link elements each facing in the same direction and adapted to pivot to positions along an arc, said element at said other end of each link engaging the said element at said one end of the adjacent link upon said link elements being pivoted to said arcuate position thereby limiting the pivoting movement of adjacent link elements relative to each other.

4. In a carrier chain link assembly for hoses or the like, comprising,
a plurality of link members, each of said link members having a pair of side walls, a plate element interconnecting said pair of side walls at each end of said link, said side walls having portions with aligned openings at each end adjacent their lower edges, pin means pivotally received in the aligned openings of adjacent link members, and said element at one end of said link extending in a plane adjacent the top of said pin means and the element at the other end extending under the adjacent pin means, said element extending in a plane adjacent the top of said pin means to provide a support surface for hoses or the like, and
said link elements each facing in the same direction and adapted to pivot to positions along an arc, said element at said other end of each link engaging the said element at said one end of the adjacent link upon said link elements being pivoted to said arcuate position thereby limiting the pivoting movement of adjacent link elements relative to each other.

5. The assembly of claim 4 wherein said element serving as a support surface is further defined as having a downwardly extending portion adjacent said one end between said pair of walls, and said downwardly extending portion terminating in a portion extending towards the other end of said link in substantially the plane of said other element interconnecting said side walls at the other end of said link whereby said hoses or the like are supported only at the ends of said links by said support portion of said one element and by the pin means at each end of said links.

6. The assembly of claim 4 wherein the side walls of each of said link members are further defined as being the side walls of an inverted U-shaped channel element having a base element serving as a cover for said link member.

References Cited by the Examiner

UNITED STATES PATENTS

| | | | |
|---|---|---|---|
| 1,570,463 | 1/1926 | Damerell | 214—34 X |
| 2,481,471 | 9/1949 | Crot | 189—34 |
| 3,082,893 | 3/1963 | Hollings et al. | 214—34 X |
| 3,157,376 | 11/1964 | Merker et al. | 248—49 |

FOREIGN PATENTS 1,117,172  2/1956  France.

CLAUDE A. LE ROY, *Primary Examiner.*